(12) United States Patent
Kadiri et al.

(10) Patent No.: US 10,791,512 B2
(45) Date of Patent: Sep. 29, 2020

(54) USER EQUIPMENT POWER CONSUMPTION AND SECONDARY CELL ACTIVATION LATENCY REDUCTIONS IN A WIRELESS COMMUNICATION SYSTEM

(71) Applicant: QUALCOMM Incorporated, San Diego, CA (US)

(72) Inventors: Prasad Kadiri, San Diego, CA (US); Srinivasan Balasubramanian, San Diego, CA (US); Supratik Bhattacharjee, San Diego, CA (US); Umesh Phuyal, San Diego, CA (US); Arnaud Meylan, San Diego, CA (US); Can Zhao, San Diego, CA (US); Aziz Gholmieh, Del Mar, CA (US); Wanshi Chen, San Diego, CA (US); Peter Gaal, San Diego, CA (US); Masato Kitazoe, Hachiouji (JP)

(73) Assignee: QUALCOMM Incorporated, San Diego, CA (US)

(*) Notice: Subject to any disclaimer, the term of this patent is extended or adjusted under 35 U.S.C. 154(b) by 12 days.

(21) Appl. No.: 16/022,092

(22) Filed: Jun. 28, 2018

(65) Prior Publication Data
US 2019/0021052 A1  Jan. 17, 2019

Related U.S. Application Data

(60) Provisional application No. 62/532,813, filed on Jul. 14, 2017.

(51) Int. Cl.
*H04W 52/02* (2009.01)
*H04W 76/27* (2018.01)
(Continued)

(52) U.S. Cl.
CPC ....... *H04W 52/0212* (2013.01); *H04L 5/0098* (2013.01); *H04W 24/10* (2013.01);
(Continued)

(58) Field of Classification Search
CPC combination set(s) only.
See application file for complete search history.

(56) References Cited

U.S. PATENT DOCUMENTS

| 2011/0134774 A1* | 6/2011 | Pelletier | H04W 52/365 370/252 |
| 2015/0117284 A1* | 4/2015 | Baldemair | H04L 1/0026 370/311 |

(Continued)

FOREIGN PATENT DOCUMENTS

WO  WO-2018083631 A1 * 5/2018 ............ H04W 76/36

OTHER PUBLICATIONS

International Search Report and Written Opinion—PCT/US2018/040429—ISA/EPO—dated Sep. 26, 2018.

*Primary Examiner* — Yee F Lam
(74) *Attorney, Agent, or Firm* — Arent Fox LLP

(57) ABSTRACT

The present disclosure provides user equipment power consumption and secondary cell (SCell) activation latency reductions in wireless communication systems. For example, a UE may determine that a secondary cell activation condition has been satisfied. The UE may further transition to a secondary cell activated state based on determining that the secondary cell activation condition has been satisfied, the secondary cell activate state corresponding to a dormant SCell state. The UE may operate at least in the dormant SCell state.

27 Claims, 10 Drawing Sheets

(51) Int. Cl.
*H04W 76/15* (2018.01)
*H04W 76/28* (2018.01)
*H04W 24/10* (2009.01)
*H04L 5/00* (2006.01)

(52) U.S. Cl.
CPC ....... *H04W 52/0206* (2013.01); *H04W 76/15* (2018.02); *H04W 76/27* (2018.02); *H04W 76/28* (2018.02); *H04L 5/0051* (2013.01); *H04L 5/0053* (2013.01)

(56) References Cited

U.S. PATENT DOCUMENTS

| | | | |
|---|---|---|---|
| 2015/0208269 A1* | 7/2015 | Damnjanovic | H04L 1/0023 370/252 |
| 2015/0327233 A1* | 11/2015 | Liu | H04W 56/0015 370/329 |
| 2016/0119969 A1 | 4/2016 | Vajapeyam et al. | |
| 2016/0192433 A1* | 6/2016 | Deenoo | H04W 76/28 370/329 |
| 2016/0295637 A1* | 10/2016 | Bergquist | H04W 76/00 |
| 2017/0201306 A1* | 7/2017 | Shimezawa | H04B 17/345 |
| 2017/0302419 A1* | 10/2017 | Liu | H04L 5/0078 |
| 2018/0287682 A1* | 10/2018 | Kwak | H04B 7/0695 |
| 2019/0305918 A1* | 10/2019 | Siomina | H04L 5/001 |

* cited by examiner

USER EQUIPMENT POWER CONSUMPTION AND SECONDARY CELL ACTIVATION LATENCY REDUCTIONS IN A WIRELESS COMMUNICATION SYSTEM

CROSS-REFERENCE TO RELATED APPLICATION(S)

This application claims the benefit of U.S. Provisional Application Ser. No. 62/532,813, entitled "USER EQUIPMENT POWER CONSUMPTION AND SECONDARY CELL ACTIVATION LATENCY REDUCTIONS IN A WIRELESS COMMUNICATION SYSTEM" and filed on Jul. 14, 2017, which is expressly incorporated by reference herein in its entirety.

BACKGROUND

Aspects of the present disclosure relate generally to wireless communication networks, and more particularly, to optimizing user equipment (UE) power consumption and reducing secondary cell (SCell) activation latency in wireless communication system employing Long Term Evolution (LTE) carrier aggregation.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for various communications technology such as, but not limited to LTE and NR, reducing UE power consumption and cell activation latency may provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method, an apparatus, and a computer-readable medium for wireless communications at a user equipment (UE). The UE may determine that a secondary cell activation condition has been satisfied. The UE may further transition to a secondary cell activated state based on determining that the secondary cell activation condition has been satisfied, the secondary cell activate state corresponding to a dormant SCell state. The UE may also operate at least in the dormant SCell state.

In another aspect, the present disclosure includes a method, an apparatus, and a computer-readable medium for wireless communications at a network entity. The network entity may determine that a UE supports a dormant SCell state. The network entity may further transmit, to the UE, a secondary cell activation indication to trigger transition to the dormant SCell state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
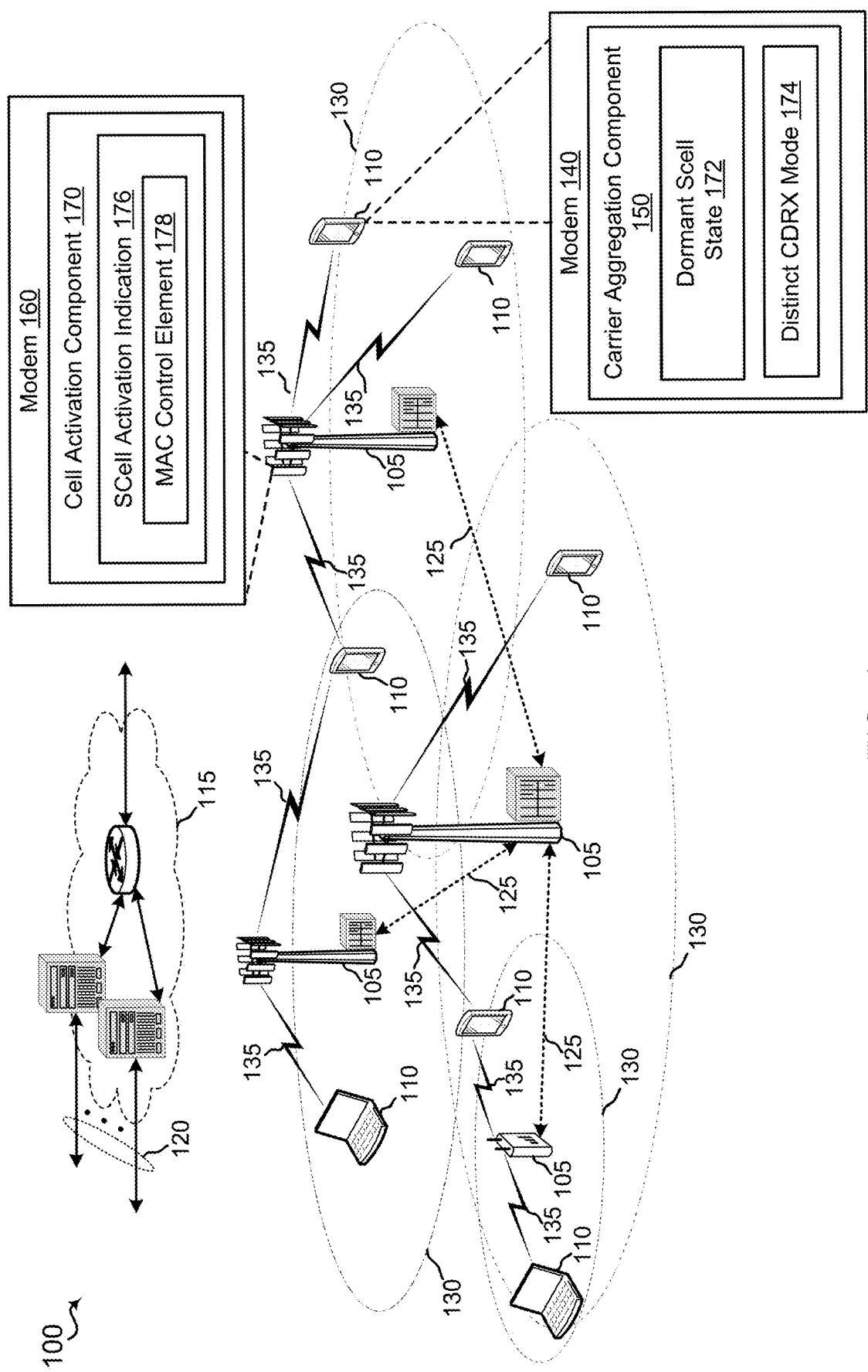
FIG. 1 is a schematic diagram of an example of a wireless communication network including at least one base station having a cell activation component and at least one user equipment (UE) having a carrier aggregation component.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to optimizing user equipment (UE) power consumption and reducing secondary cell (SCell) activation latency in wireless communication system employing Long Term Evolution (LTE) carrier aggregation. Carrier aggregation permits the use of more than one carrier in order to increase overall transmission bandwidth. To perform carrier aggregation, a UE may, in coordination with a network entity (e.g., eNB), initially select to a primary cell (PCell) and then have allocated one or more secondary cells (SCell) after evaluation by the network that such cells can also serve the UE.

When a SCell is activated through a media access control (MAC) control element (CE), the UE may monitor an SCell physical downlink control channel (PDCCH) every one ms transmit time interval (TTI) or a short TTI. When the UE enters into a connected mode DRX (CDRX) state, UE may still monitor SCell PDCCH during a CDRX on or activated period, resulting in significant SCell power consumption if the SCell is not deactivated based on SCell usage. Further, when there is no data to be scheduled on one or more SCells, the SCells may be deactivated through a MAC-CE deactivation procedure. However, SCell MAC-CE based activation and deactivation may cause longer delay. For example, SCell MAC-CE activation may not be sufficiently efficient so as to quickly activate SCells (e.g., through MAC-CE procedure) to offload bursty traffic quickly and efficiently to licensed or unlicensed SCells. One way to improve effective utilization of SCells (i.e., to enable quick scheduling on a SCell for quick bursty data offload) may be to maintain the SCell in an activated state while SCell is configured. In SCell active state, UE may perform PDCCH monitoring, active PDSCH/PUSCH data transfer, and is allowed to send channel state information (CSI) such as channel quality information (CQI) and/or sounding reference signal (SRS) based on eNB configuration. In some aspects, a state, substate, and/or mode may be the same. This may allow effective SCell offload quickly, yet significant power consumption may be incurred by UE due to the SCell PDCCH monitoring procedure. Thus, it may be desirable to conserve UE power consumption for SCells in an activated SCell State and also enable quick offloading of data to activated SCells.

As such, in an aspect, the present aspects provide a UE that may determine that a secondary cell activation condition has been satisfied. The UE may further transition to a secondary cell activated state based on determining that the secondary cell activation condition has been satisfied, the secondary cell activate state corresponding to a dormant SCell state. The UE may also operate at least in the dormant SCell state.

The present aspects also provide a UE that may receive a secondary cell activation indication to trigger an activation of a secondary cell while connected with a primary cell. The UE may further activate the secondary cell in response to receiving the secondary cell activation indication, wherein the primary cell is associated with a first connected mode discontinuous reception (CDRX) cycle and the secondary cell is associated with a second CDRX cycle different from the first CDRX cycle. The UE may also monitor a physical downlink control channel (PDCCH) for at least one of the primary cell according to the first CDRX cycle or the secondary cell according to the second CDRX cycle.

In a further aspect, a UE may activate the secondary cell in response to receiving a secondary cell activation indication, the primary cell is associated with a first connected state discontinuous reception (CDRX) cycle and the secondary cell is associated with a second CDRX cycle different from the first CDRX cycle. The UE may further monitor a physical downlink control channel (PDCCH) for at least one of the primary cell according to the first CDRX cycle or the secondary cell according to the second CDRX cycle. The UE may also transition to a secondary cell activated state based on determining that a secondary cell activation condition has been satisfied, the secondary cell activate state including a dormant SCell state. Moreover, the UE may operate at least in the dormant SCell state.

Additionally, a network entity may receive an indication that a UE supports a dormant SCell state. The network entity may further transmit, to the UE, a secondary cell activation indication as a media access layer (MAC) control element to trigger transition to the dormant SCell state.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include at least one UE 110 in communication with a base station 105. The UE 110 may have a modem 140 having a carrier aggregation component 150, which may be configured to operate in at least one of, or a combination of a dormant SCell state 172 or a distinct CDRX mode 174.

The UE 110 may, while operating in the dormant SCell state 172, which may be a sub state within the UE SCell activated state or a separate state (e.g., see FIG. 2C), be configured in a such a way so as to conserve power while permitting efficient operation of various procedures such as measurement reporting. For example, in the dormant SCell state 172, the UE 110 may not monitor PDCCH of SCells to conserve UE power supply. Further, the UE may perform one or more of channel state information (CSI) only, CSI+SRS, SRS only (e.g., for TDD LTE case with reciprocity) reporting based on eNB CSI configuration, NZP (Non-Zero Power) CSI-RS/IMR (Interference Measurement Report) configuration, and/or SRS configuration for SCell in the dormant SCell state 172. The forgoing may help the eNB (e.g., base station 105) to keep track of the UE's 110 channel conditions and help the eNB to make SCell scheduling decisions quickly when the UE 110 transitions to a PDCCH monitoring mode. The dormant SCell state 172 may also assist the UE 110 in maintaining synchronization with the SCell while operating in dormant SCell state 172.

In some aspects, while in the dormant SCell state 172, CSI configuration, NZP CSI-RS/IMR configuration and SRS configuration used in the dormant SCell state 172 may be specific to this low power mode (e.g., CQI reporting Interval, CSI-RS Configuration, PUCCH Resources etc.) or may use the same CQI or SRS reporting as in legacy in this mode. For example, in an aspect, in the dormant SCell state 172, CSI and SRS reporting may occur during CDRX on or active state only or alternatively CSI reporting may be performed irrespective of the CDRX state (e.g., this may ensure the eNB obtains the CSI reporting even in long DRX operations). Hence, the UE 110 may report CSI of the secondary component carrier (SCC) in this state even in CDRX sleep state for SCells.

Further, in an aspect, CQI reporting for SCells in the dormant SCell state 172 may be on at least one PCell or any of the one or more SCells during PDCCH monitoring active state. Moreover, the CSI reported in the dormant SCell state 172 may be a different and/or simplified CSI. For example, rank-1 only CQI reporting may be defined for the dormant SCell state 172, such that the UE 110 can use one RX only during the wakeup and report a Rank-1 CQI. This may be sufficient for scheduling start and then when the UE 110 moves to PDCCH active monitoring state, some or all reception antennas may be switched on and use the default CQI configurations.

Additionally, CSI and/or SRS related configuration in the dormant SCell state 172 may be separately managed. For example, the UE 110 may be configured to monitor NZP CSI-RS and/or IMR with a longer periodicity, and/or to report CSI with a longer periodicity as well. The UE 110 may also be configured with a SRS transmission having a longer periodicity and/or simplified SRS operation (e.g., only 1-port SRS transmission in this state vs. multi-port SRS transmission in the activated state).

In some aspects, when the SCell is deactivated or turned off (e.g., for conserving small cell power), one or more discovery reference signals (DRS) may be transmitted (e.g., by an eNB) periodically based on a DRS configuration to assist the UE 110 with radio resource management (RRM) measurements. The DRS may include one or more of a cell RS, CSI-RS, primary synchronization signal (PSS), and/or a secondary synchronization signal (SSS). Further, when UE is in dormant SCell state 172, the UE 110 may make use of DRS signals for low fidelity CSI Measurements. UE implementations may control how to measure CQI based on the DRS transmission instances and report to the eNB (e.g., base station 105). For instance, suppose if the UE 110 is configured to report CQI in sub frame "n", based on the UE implementation, the UE 110 can perform measurements on DRS based CRS/CSI-RS transmitted in sub frame "n-m". If the UE 110 does not detect any DRS in "n-m" time frame, the UE 110 can report "Null CQI".

In some aspects, the UE 110 can utilize SRS carrier based switching for SRS reporting in dormant SCell state 172.

The UE 110 may, while operating in the distinct CDRX mode 174, be configured to provide different CDRX cycles for at least one PCell and/or SCell(s). For instance, the distinct CDRX mode 174 may be configured per component carrier (CC) DRX state and parameters (cycle, inactivity timer, etc.) instead of legacy per-UE state. Further, for SCells, the active period (e.g., OnDuration) and inactivity timers may be shorter than in PCell. Moreover, PCell and SCell CDRX parameters can be synchronous (e.g., start or end of DRX on periods of both PCell and SCell coincide, or on duration of one completely falls within on duration of other) or asynchronous.

In some aspects, while operating in the distinct CDRX mode 174, the UE 110 may have a long DRX cycle on at least one SCell, but may avoid high latency to start using the SCell. For example, DRX wakeup from a primary component carrier (PCC) can be used to wake up the SCC in the middle of SCC sleep.

The UE 110 may, via the carrier aggregation component 150, employ a hybrid of the dormant SCell state 172 and the distinct CDRX mode 174. That is, the dormant SCell state 172 and the distinct CDRX mode 174 may be performed simultaneously, or one or more aspects from each mode may be performed together or as part of a hybrid mode. For example, the dormant SCell state 172 may be introduced along with the distinct CDRX mode 174 for the PCell and one or more SCell(s).

Wireless communication network 100 may also include at least one base station 105 may have a modem 160, which in turn includes a cell activation component 170 configured to receive an indication that the UE 110 supports a dormant SCell state 172. The base station 105 may further transmit, to the UE 110, a secondary cell activation indication as a MAC control element to trigger transition to the dormant SCell state 172. Specifically, UE capability may be useful to indicate to the base station 105 that the UE 110 supports at least the dormant SCell state 172 and corresponding state transitions as further described herein with respect to FIG. 2C. Alternatively, the dormant SCell state 172 may be implied based on UE release version implicitly. In some aspects, the network may indicate support for the dormant SCell state 172 and associated transitions by using dedicated signaling such as RRC connection reconfiguration and/or using broadcast signaling such as via system information blocks (SIB).

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2A:
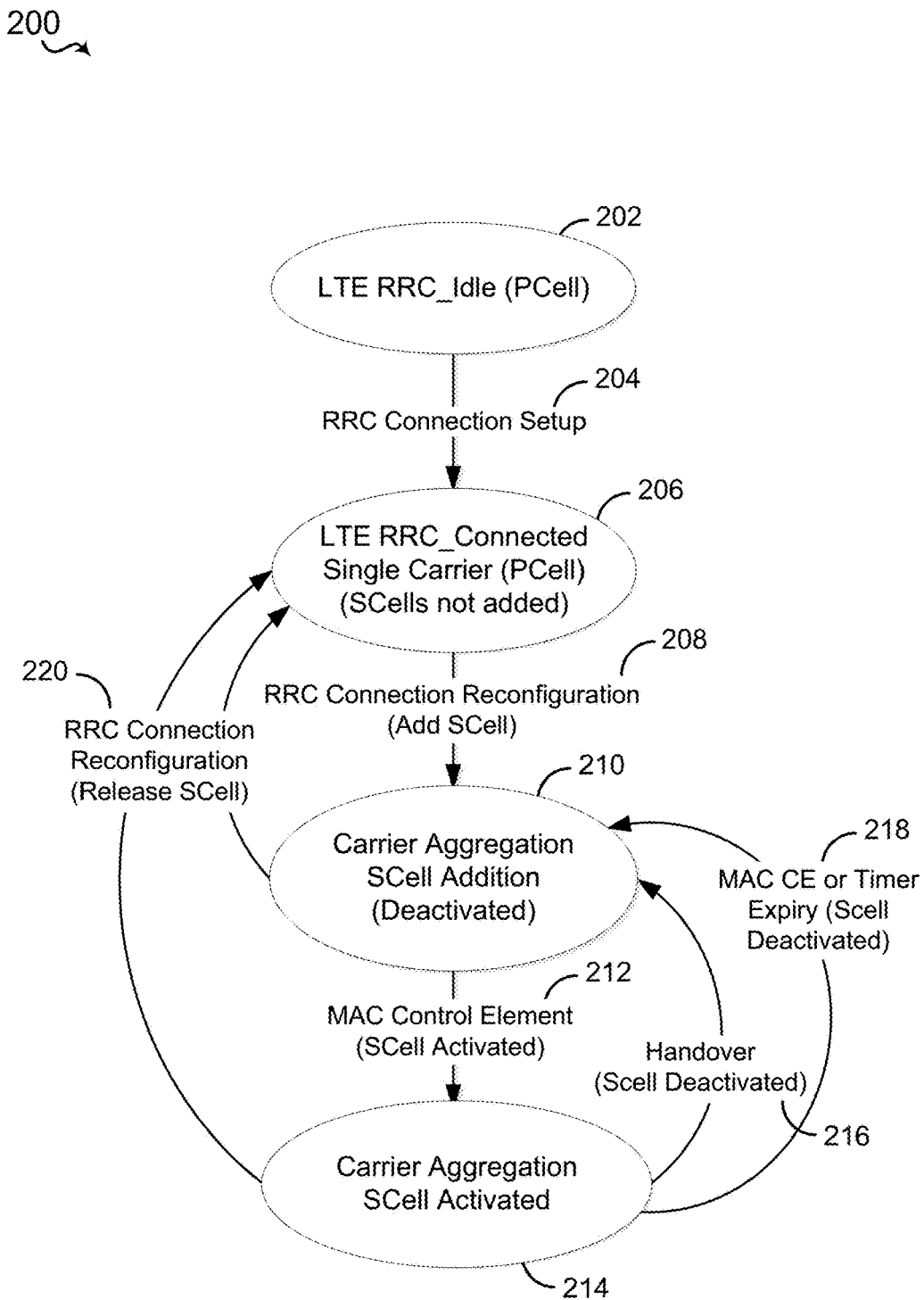
FIG. 2A is a state diagram of an example carrier aggregation scheme according to one or more aspects described herein.

FIG. 2A is a state diagram of an example carrier aggregation scheme 200. In some aspects, LTE Advanced carrier aggregation may support five carrier aggregations (e.g., one PCell and up to four SCells). Further, dual connectivity may allow carrier aggregation between two eNBs. In further implementations, 32 carrier aggregation may be supported (e.g., one PCell and up to 31 SCells).

In the carrier aggregation scheme 200, at 202, the UE may enter LTE RRC idle state with respect to a PCell. At 204, an RRC connection setup may be initiated between the UE and the network. At 206, the UE may transition to an LTE RRC connected state with a single carrier PCell (e.g., no SCells may be added at this point however). In some aspects, the UE may indicate carrier aggregation capabilities via an RRC UE capability information indication. In some aspects, the carrier aggregation capabilities may include capabilities indicating support for new states and/or transitions. At 208, the eNB uses an RRC reconfiguration message for SCell configuration (e.g., with or without SCell measurements from the UE, as eNB implementation choice). At 210, upon SCell configuration, SCell may remain in a deactivated state (e.g., by default). At 212, the eNB may use MAC control element commands for SCell activation. At 214, when SCell is activated, the UE monitors SCell PDCCH during CDRX on state (e.g., CDRX may be common for both PCell and SCells). At 216, as a result of handover, the SCell may be deactivated and the carrier aggregation scheme 200 may return to 210. Similarly, at 218, the carrier aggregation scheme 200 may return to 210 when a MAC control element is received or a deactivation timer expires. At 220, an RRC connection reconfiguration may release an SCell such that the carrier aggregation scheme 200 returns to 206.

Figure 2B:
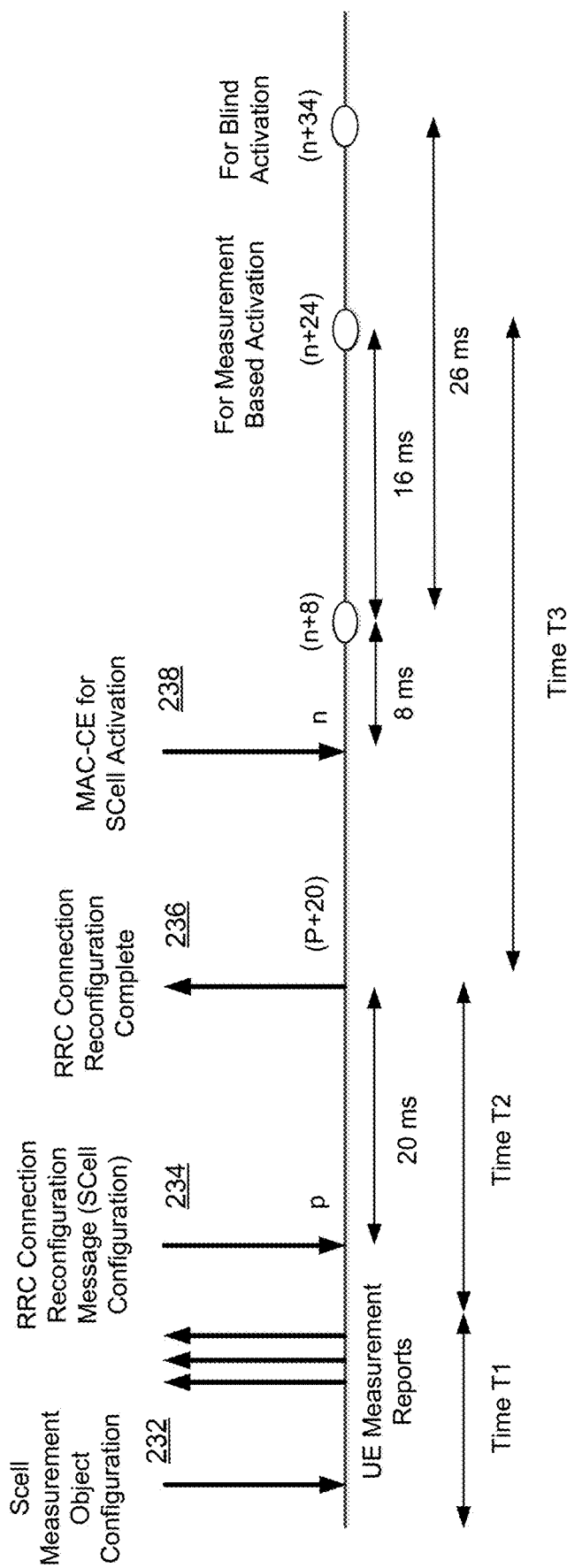
FIG. 2B is a carrier aggregation secondary cell activation timeline according to one or more aspects described herein.

FIG. 2B is a carrier aggregation secondary cell MAC control element activation timeline 230. At 232, an SCell measurement object configuration may be performed. At 234, an RRC connection reconfiguration message (SCell configuration) may be conducted. At 236, the RRC connection reconfiguration may be completed. At 238, the MAC control element for SCell activation may be transmitted by the eNB and/or received by the UE 110. For example, when a downlink SCell activation (e.g., via MAC control element) is received in subframe (SF) "n", the UE 110 may be able to complete a number of SCell actions by SF n+24 or n+34 (e.g., but not before n+8), such as, but not limited to CSI (CQI/PMI/RI) reports, PDCCH monitoring on SCell, UL SRS transmissions, and/or PDSCH Reception/PUSCH transmissions.

While the UE 110 is in a RRC connected state, after SCell is configured and activated, a common CDRX mechanism may be applicable for both PCell and Active SCells. During CDRX mode, and/or during CDRX on period, the UE 110 may monitor PDCCH for both PCell and one or more active SCells. Further, when the downlink SCell deactivation (e.g., via MAC control element) is received in SF 'n', the UE 110 may stop a number of SCell actions no later than n+8, such as, but not limited to stop the SCell normal SCell operation including, uplink SRS transmissions, CSI (CQI/PMI/RI)

reporting, PDCCH monitoring on/for the SCell, and/or PDSCH reception/PUSCH transmission, or stop the SCell deactivation timer.

Figure 2C:
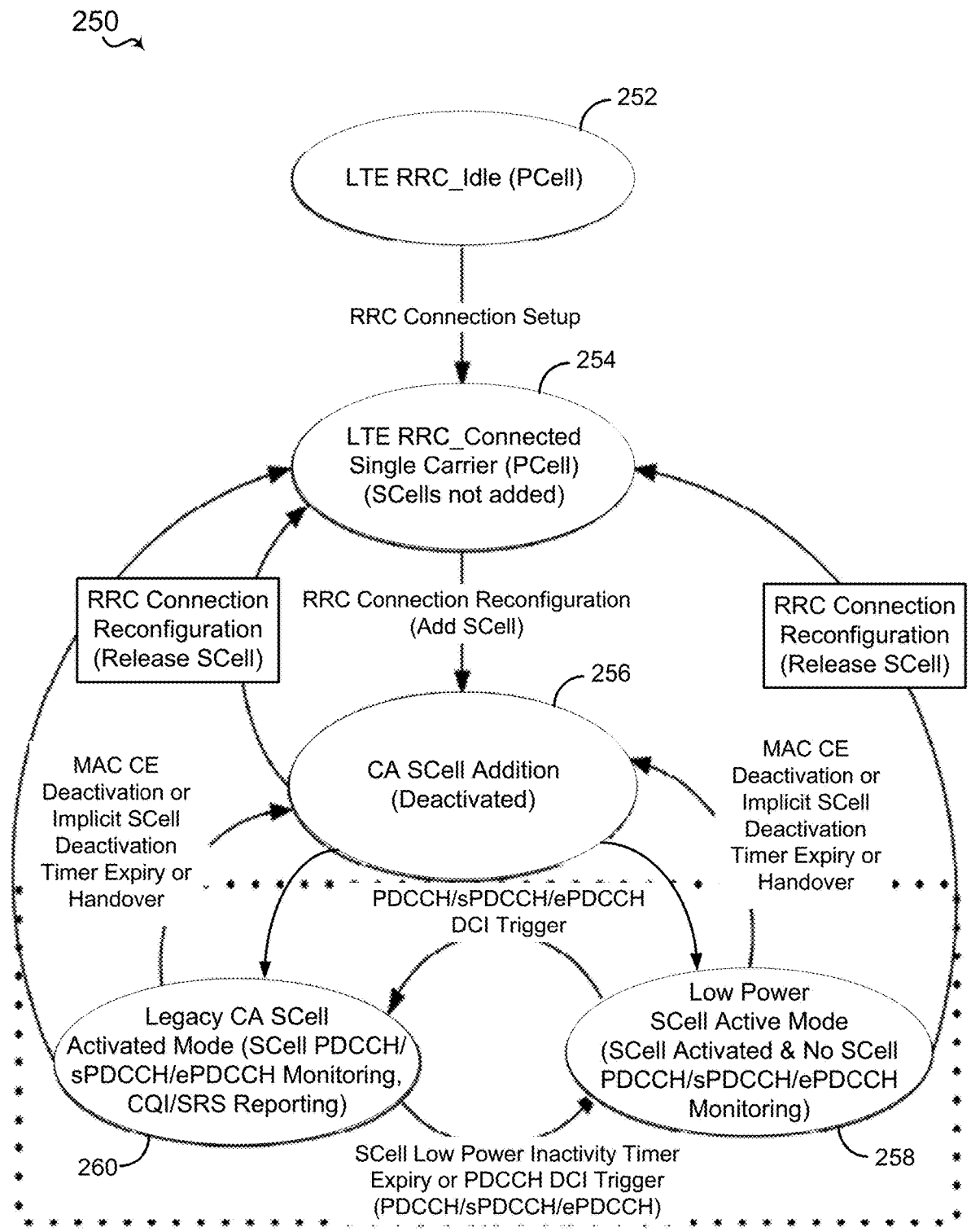
FIG. 2C is state diagram of an example carrier aggregation scheme employing a low power secondary cell active mode according to one or more aspects described herein.

FIG. 2C is state diagram of an example carrier aggregation scheme 250 employing a low power secondary cell active mode. In the carrier aggregation scheme 250, at 252, the UE may enter LTE RRC idle state with respect to a PCell. An RRC connection setup may be initiated between the UE and the network. At 254, the UE may transition to an LTE RRC connected state with a single carrier PCell (e.g., no SCells may be added at this point however). In some aspects, the UE may indicate capabilities to support new states and/or transitions via an RRC UE capability information indication. The eNB uses an RRC reconfiguration message for SCell configuration (e.g., with or without SCell measurements from the UE, as eNB implementation choice). At 256, upon SCell configuration, SCell may remain in a deactivated state (e.g., by default).

At 258, the UE may transition from the SCell deactivated to the dormant SCell state 172 based on a MAC control element. In one instance, the UE may be allowed to enter the dormant SCell state 172 based on the MAC control element. Alternatively, the UE may be allowed to enter the dormant SCell state 172 or a legacy transition at 280 at a time. The forgoing may be disambiguated according to a number of schemes.

For example, in one aspect, as shown in Tables 1 and 2, a reserved 'R' bit in a legacy MAC control element may be used (e.g., by the network) to indicate that R=1 means enter the dormant SCell state 172.

TABLE 1

Activation/Deactivation MAC control element of one octet

| $C_7$ | $C_6$ | $C_5$ | $C_4$ | $C_3$ | $C_2$ | $C_1$ | R | Oct 1 |
|---|---|---|---|---|---|---|---|---|

TABLE 2

Activation/Deactivation MAC control element of four octets

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

In some aspects, as shown in Table 3, a UE may transition to the dormant SCell state 172 using an activation/deactivation MAC CE (i.e., new LCD) instead of legacy activation/deactivation MAC CE. The presence of the new LCD may mean that a legacy activation/deactivation MAC control element is not applicable. In some aspects, as shown in Table 4, a MAC control element command (i.e., identified by a new LCD) may be used to indicate that the UE should perform transition to the dormant SCell state 172 upon reception of a legacy activation/deactivation MAC control element. In one example, the MAC control element can be zero-length.

TABLE 3

Values of LCID for DL-SCH

| Index | LCID values |
|---|---|
| 00000 | CCCH |
| 00001-01010 | Identity of the logical channel |
| 01011-11000 | Reserved |

TABLE 3-continued

Values of LCID for DL-SCH

| Index | LCID values |
|---|---|
| 10111 | New Activation/Deactivation (4 octets) |
| 10110 | New Activation/Deactivation (1 octet) |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

NOTE:
Both SC-MCCH and SC-MTCH cannot be multiplexed with other logical channels in the same MAC PDU except for Padding and SC-PTM Stop Indication

TABLE 4

Values of LCID for DL-SCH

| Index | LCID values |
|---|---|
| 00000 | CCCH |
| 00001-01010 | Identity of the logical channel |
| 01011-1001 | Reserved |
| 10110 | Transit to Low Power Mode Command |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

NOTE:
Both SC-MCCH and SC-MTCH cannot be multiplexed with other logical channels in the same MAC PDU except for Padding and SC-PTM Stop Indication In some aspects, the UE may transition from the dormant SCell state 172 at 258 to an SCell deactivated state at 256 via a MAC control element deactivation method or implicitly via an SCell deactivation timer expiration for a given SCell or due to handover. The deactivation timer may be a default timer or a different timer that can be defined so that the value can be larger than the legacy values.

The UE may transition from the SCell activated state having PDCCH monitoring at 260 to the dormant SCell state 172 not having PDCCH Monitoring by UE at 258 via a low power inactivity timer expiration (e.g., Low Power Inactivity_Timer Expiry) specific to or associated with an SCell or a PDCCH downlink control information (DCI) trigger received on at least one PCell or SCell. For example, the low power inactivity timer may be a function of a CDRX inactivity timer or a distinct defined timer. The transition from 260 to 258 may be prioritized by defining a shorter low power inactivity timer compared to legacy SCell inactivity timer, in which case a transition may be made to 256 due to the SCell inactivity timer expiry not occurring.

The UE may transition from the dormant SCell state 172 at 258 to the SCell PDCCH active monitoring state at 260 via a PDCCH DCI trigger received on at least one PCell or other SCell(s). For example, the PDCCH DCI trigger received on a PCell or other SCell(s) may reduce latency to activate SCell compared to a latency of a MAC control element activation procedure. The DCI may be used for transitioning SCell from the dormant SCell state 172 to the PDCCH active monitoring state at 260 (e.g., different from the scheduling DCI, which can be legacy DCI), or also be used to transition and to schedule on SCells together. The PDCCH DCI can be transmitted either using a one ms TTI or a Short TTI.

Further, the PDCCH DCI can be used to indicate individual SCell identifiers or a group of SCells. The mapping between SCell activation bits to individual SCell identifiers or SCell identifier groups (e.g., each SCell group can be configured with multiple SCell identifiers) can be configured through RRC reconfiguration procedure during SCell configuration procedure, allowing a reduction in a number of SCell activation bits used, and also allowing a same band/inter band SCells with approximately similar coverage to be grouped together and activated effectively. The forgoing may also allow flexibility in activating only desired SCell identifiers rather than activating all SCells to PDCCH monitoring mode.

The UE may transition from the SCell deactivated state at 256 to the SCell activated state 260 (e.g., through a MAC control element). A UE may operate according to or otherwise be in one of the states at 258 or 260 at a time, as described above.

The UE may transition from SCell active PDCCH monitoring mode at 260 to an SCell deactivated at 256 through a MAC control element deactivation procedure or implicitly via an SCell deactivation timer expiry for a given SCell.

The transition from the SCell activated mode at 260 to the dormant SCell state 172 at 258 may be prioritized by defining a shorter low power inactivity timer, in which case the transition from the SCell activated mode at 260 to SCell deactivated mode 260 due to the SCell inactivity timer expiry may not happen.

The UE may release the SCell and return to the single carrier PCell at 254, for example, when the UE receives an RRC connection reconfiguration message with SCell release during SCell active modes (e.g., dormant SCell state 172 at 258 or PDCCH monitoring mode at 260). The UE may release the corresponding SCell(s) as indicated in the RRC connection reconfiguration message.

In some aspects, from a carrier aggregation UE State machine perspective, MAC control element activation and deactivation may be considered as an outer loop, and the transition between dormant SCell state 172 at 258 and the PDCCH monitoring mode at 260 may be considered as an inner loop operation of an SCell.

In some aspects, based on the RRC connection reconfiguration procedure, during SCell configuration, SCells may be allowed to enter directly into dormant SCell state 172 as soon as the SCell is configured, thereby bypassing the SCell deactivate state at 256 and use of a MAC control element to activate SCell by using the RRC information element specified per configured SCell basis or for all configured SCells. In some aspects, and example indication may include or otherwise correspond to a Boolean indication "AllowedDirectTransitionToLowPowerState=True or False".

Figure 3A:
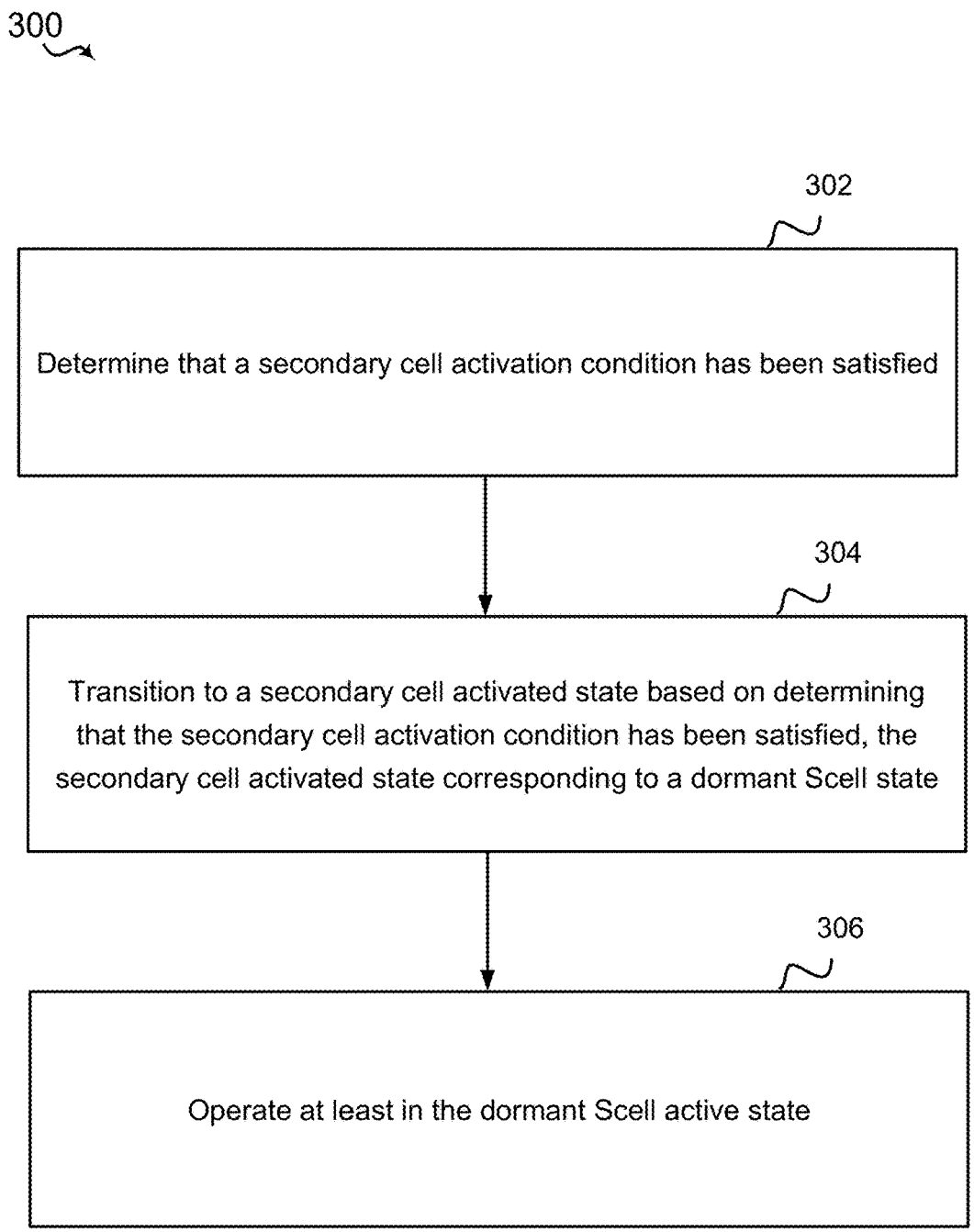
FIG. 3A is a flow diagram of an example of a method of wireless communication at a UE.

Referring to FIG. 3A, for example, a method 300 of wireless communication in operating a UE such as UE 110 according to the aspects described herein to operate in a dormant SCell state according to one or more of the herein-defined actions.

At block 302, the method 300 may determine that a secondary cell activation condition has been satisfied. For example, as described herein, modem 140 of UE 110 may execute carrier aggregation component 150 to determine that a secondary cell activation condition has been satisfied.

In some aspects, determining that the secondary cell activation condition has been satisfied may include receiving, from a network entity, a secondary cell activation indication as a MAC control element.

In some aspects, the MAC control element may include a reserve bit in at least one octet set to a value greater than zero to trigger a transition to the dormant SCell state.

In some aspects, the MAC control element may correspond to a distinct LCID having an index value of at least one of '01011-11000', '10111', '10110', or an unused LCD.

In some aspects, the MAC control element corresponds to a zero-length MAC control element command identified by a distinct LCID having an index value of at least one of '01011-1001' or '10110', or an unused LCID.

In some aspects, determining that the secondary cell activation condition has been satisfied may include receiving a RRC information element following configuration of the least one secondary cell during RRC connection reconfiguration.

At block 304, the method 300 may transition to a secondary cell activated state based on determining that the secondary cell activation condition has been satisfied, the secondary cell activate state including a dormant SCell state. For example, as described herein, modem 140 of UE 110 may execute carrier aggregation component 150 to transition to a secondary cell activated state based on determining that the secondary cell activation condition has been satisfied, the secondary cell activate state including a dormant SCell state 172.

In some aspects, transitioning to the secondary cell activated state may include transitioning from a secondary cell deactivated state to the secondary cell activated state based on determining that the secondary cell activation condition has been satisfied.

At block 306, the method 300 may operate at least in the dormant SCell state. For example, as described herein, modem 140 of UE 110 may execute carrier aggregation component 150 to operate at least in the dormant SCell state 172.

In some aspects, operating in the dormant SCell state 172 may include at least one of reporting at least one of CSI, SRS information based on received CSI configuration, CSI+SRS, NZP CSI-RS/IMR configuration, SRS Configuration information associated with at least one secondary cell while in a reduced power mode, or forgoing PDCCH monitoring of the at least one secondary cell.

In some aspects, each of the at least one of the CSI, SRS, NZP CSI-RS, or IMR information may be separately configurable.

In some aspects, the reporting may include reporting of at least one of CSI or SRS in at least one of an activated connected state CDRX or irrespective of a CDRX state.

In some aspects, the reporting may include CSI reporting measurement information for the at least one secondary cell on a primary cell or one or more different secondary cells.

In some aspects, the reporting may include reporting the SRS using SRS carrier based switching in the dormant SCell state.

In some aspects, forgoing of PDCCH monitoring includes forgoing monitoring of at least one of a PDCCH, an sPDCCH, or an ePDCCH.

Although not shown, the method 400 may receive a DRS periodically based on a DRS configuration during a secondary cell deactivated state. For example, as described herein, modem 140 of UE 110 may execute at least a transceiver 502 to receive a DRS periodically based on a DRS configuration during a secondary cell deactivated state.

In some aspects, the reporting may include reporting the CSI in the dormant SCell state 172 based on the DRS signal.

Although not shown, the method 400 may determine that a secondary cell deactivation condition has been satisfied based on at least one of detecting an expiration of a MAC secondary cell deactivation timer, receiving a MAC control element indicating a secondary cell deactivation, or detecting handover to another cell associated with at least one secondary cell. For example, as described herein, modem 140 of UE 110 may execute dormant SCell state 172 to determine that a secondary cell deactivation condition has been satisfied based on at least one of detecting an expiration of a MAC secondary cell deactivation timer, receiving a MAC control element indicating a secondary cell deactivation, or detecting handover to another cell associated with at least one secondary cell.

Although not shown, the method 400 may receive, on a PDCCH at a primary cell or a secondary cell, DCI to trigger a transition from the secondary cell low power activated state to a distinct secondary cell activated state, the distinct secondary cell activated state including PDCCH monitoring, and transition from the secondary cell activated low power state to the distinct secondary cell activated state in response to receiving the DCI on the PDCCH. For example, as described herein, modem 140 of UE 110 may execute dormant SCell state 172 to receive, on a PDCCH at a primary cell or a secondary cell, DCI to trigger a transition from the secondary cell low power activated state to a distinct secondary cell activated state, the distinct secondary cell activated state including PDCCH monitoring, and transition from the secondary cell activated low power state to the distinct secondary cell activated state in response to receiving the DCI on the PDCCH.

In some aspects, the DCI may have a TTI of at least one of one millisecond or a length corresponding to a short TTI.

In some aspects, the DCI may include a mapping of at least one secondary cell activation bit to one of an individual secondary cell identifier or a group secondary cell identifier.

Although not shown, the method 400 may determine that a secondary cell state transition condition has been satisfied, and transition to the secondary cell low power activated mode from a distinct secondary cell activated state based on determining that the secondary cell state transition condition has been satisfied. For example, as described herein, modem 140 of UE 110 may execute dormant SCell state 172 to determine that a secondary cell state transition condition has been satisfied, and transition to the secondary cell low power activated mode from a distinct secondary cell activated state based on determining that the secondary cell state transition condition has been satisfied.

In some aspects, determining that the secondary cell state transition condition has been satisfied may include at least one of receiving, on a PDCCH at a primary cell or a secondary cell, DCI to trigger a transition to the secondary cell low power activated state from a distinct secondary cell activated state, the distinct secondary cell activated state including PDCCH monitoring, or detecting an expiration of a reduced power inactivity timer associated with at least one secondary cell.

In some aspects, the reduced power inactivity timer is a function of a connected mode CDRX inactivity timer, or a timer independent of the CDRX inactivity timer.

Although not shown, the method 400 may transition from the secondary cell low power activated state to the secondary cell deactivated state based at least on one of receiving a secondary cell deactivation indication corresponding to a MAC control element, or detecting an expiration of a MAC secondary cell deactivation timer associated with at least one secondary cell. For example, as described herein, modem 140 of UE 110 may execute dormant SCell state 172 to transition from the secondary cell low power activated state to the secondary cell deactivated state based at least on one of receiving a secondary cell deactivation indication corresponding to a MAC control element, or detecting an expiration of a MAC secondary cell deactivation timer associated with at least one secondary cell.

Although not shown, the method 400 may receive a radio resource control (RRC) reconfiguration message to trigger a release of at least one secondary cell from the secondary cell activated state, and release the at least one secondary cell and maintaining an RRC connected state with a primary cell. For example, as described herein, modem 140 of UE 110 may execute dormant SCell state 172 to receive a radio resource control (RRC) reconfiguration message to trigger a release of at least one secondary cell from the secondary cell activated state, and release the at least one secondary cell and maintaining an RRC connected state with a primary cell.

Figure 3B:
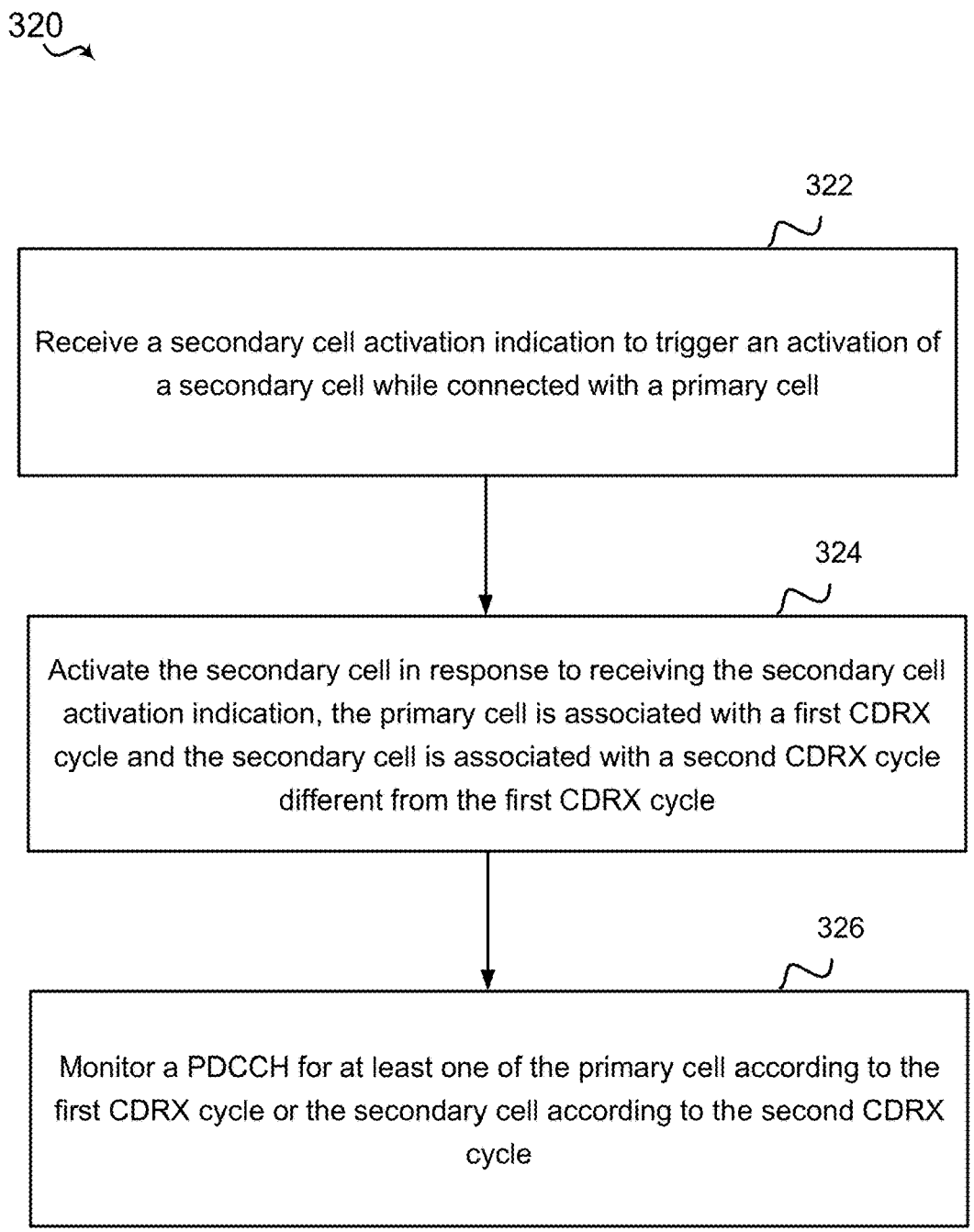
FIG. 3B is a flow diagram of another example of a method of wireless communication at a UE.

Referring to FIG. 3B, for example, a method 320 of wireless communication in operating a UE such as UE 110 according to the aspects described herein to operate in a distinct CDRX mode according to one or more of the herein-defined actions.

At block 322, the method 320 may receive a secondary cell activation indication to trigger an activation of a secondary cell while connected with a primary cell. For example, as described herein, modem 140 of UE 110 may execute at least the transceiver 502 to receive a secondary cell activation indication to trigger an activation of a secondary cell while connected with a primary cell.

At block 324, the method 320 may activate the secondary cell in response to receiving the secondary cell activation indication, the primary cell is associated with a first CDRX cycle and the secondary cell is associated with a second CDRX cycle different from the first CDRX cycle. For example, as described herein, modem 140 of UE 110 may execute carrier aggregation component 150 to activate the secondary cell in response to receiving the secondary cell activation indication, the primary cell is associated with a first CDRX cycle and the secondary cell is associated with a second CDRX cycle different from the first CDRX cycle.

In some aspects, the second CDRX cycle may be shorter than the first CDRX cycle.

At block 326, the method 320 may monitor a PDCCH for at least one of the primary cell according to the first CDRX cycle or the secondary cell according to the second CDRX cycle. For example, as described herein, modem 140 of UE 110 may execute carrier aggregation component 150 to monitor a PDCCH for at least one of the primary cell according to the first CDRX cycle or the secondary cell according to the second CDRX cycle.

In some aspects, monitoring of the PDCCH includes monitoring, synchronously or asynchronously, the PDCCH for both of the primary cell according to the first CDRX cycle or the secondary cell according to the second CDRX cycle.

Although not shown, the method 320 may detect a termination of the first CDRX cycle associated with the primary cell, and terminate the second CDRX cycle prior to expiration in response to detecting the termination of the first CDRX cycle. For example, as described herein, modem 140 of UE 110 may execute carrier aggregation component 150 to detect a termination of the first CDRX cycle associated with the primary cell, and terminate the second CDRX cycle prior to expiration in response to detecting the termination of the first CDRX cycle.

Figure 3C:
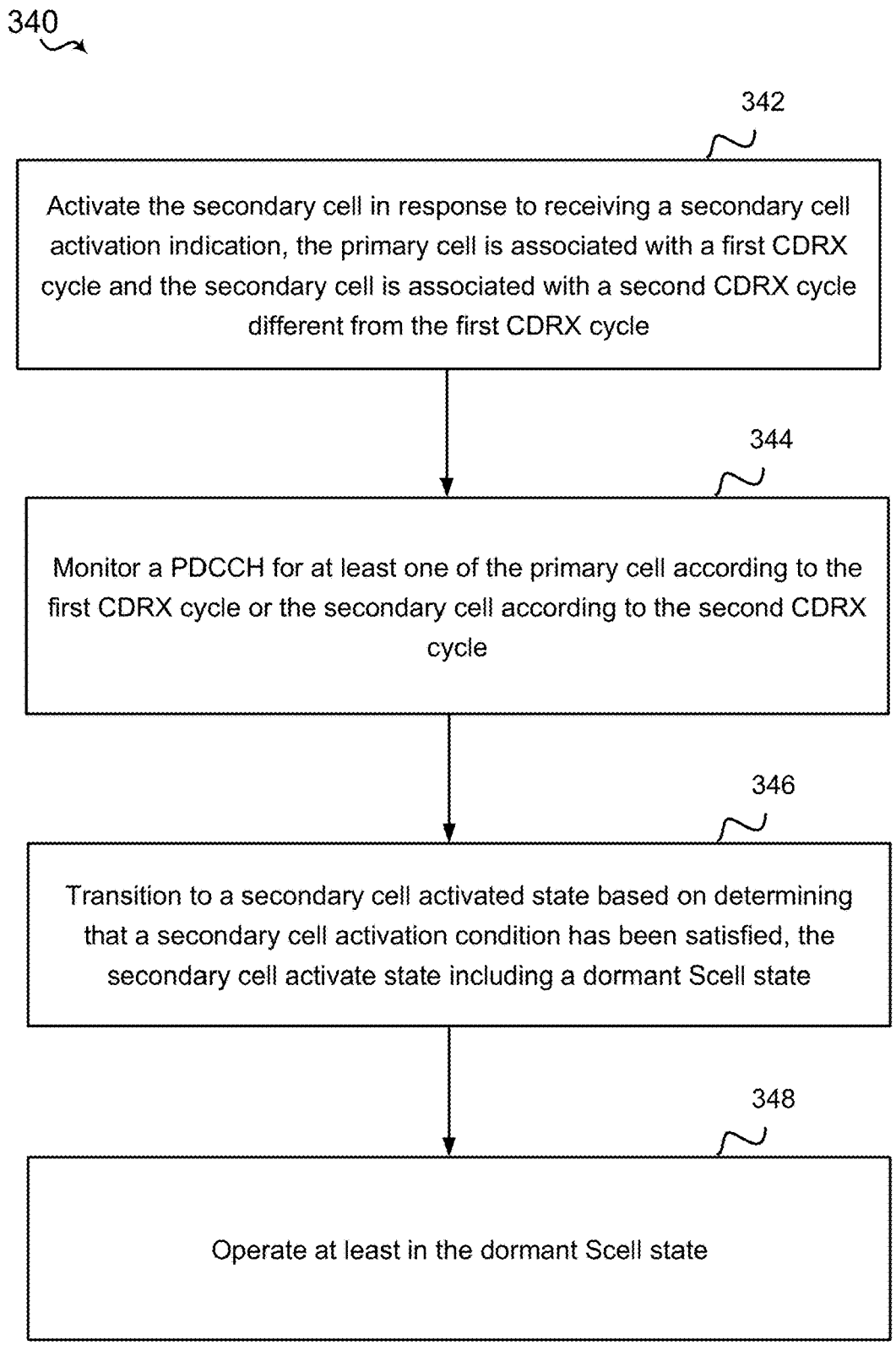
FIG. 3C is a flow diagram of a further example of a method of wireless communication at a UE.

Referring to FIG. 3C, for example, a method 340 of wireless communication in operating a UE such as UE 110 according to the aspects described herein to perform carrier aggregation as a hybrid of the dormant SCell state 172 and distinct CDRX mode 174 according to one or more of the herein-defined actions.

At block 342, the method 340 may activate the secondary cell in response to receiving a secondary cell activation indication, the primary cell is associated with a first CDRX cycle and the secondary cell is associated with a second CDRX cycle different from the first CDRX cycle. For example, as described herein, modem 140 of UE 110 may execute carrier aggregation component 150 to activate the secondary cell in response to receiving a secondary cell activation indication, the primary cell is associated with a first CDRX cycle and the secondary cell is associated with a second CDRX cycle different from the first CDRX cycle.

At block 344, the method 340 may monitor a PDCCH for at least one of the primary cell according to the first CDRX cycle or the secondary cell according to the second CDRX cycle. For example, as described herein, modem 140 of UE 110 may execute carrier aggregation component 150 to monitor a PDCCH for at least one of the primary cell according to the first CDRX cycle or the secondary cell according to the second CDRX cycle.

At block 346, the method 340 may transition to a secondary cell activated state based on determining that a secondary cell activation condition has been satisfied, the secondary cell activate state including a dormant SCell state. For example, as described herein, modem 140 of UE 110 may execute carrier aggregation component 150 to transition to a secondary cell activated state based on determining that a secondary cell activation condition has been satisfied, the secondary cell activate state including a dormant SCell state 172.

At block 348, the method 340 may operate at least in the dormant SCell state. For example, as described herein, modem 140 of UE 110 may execute carrier aggregation component 150 to operate at least in the dormant SCell state 172.

Figure 4:
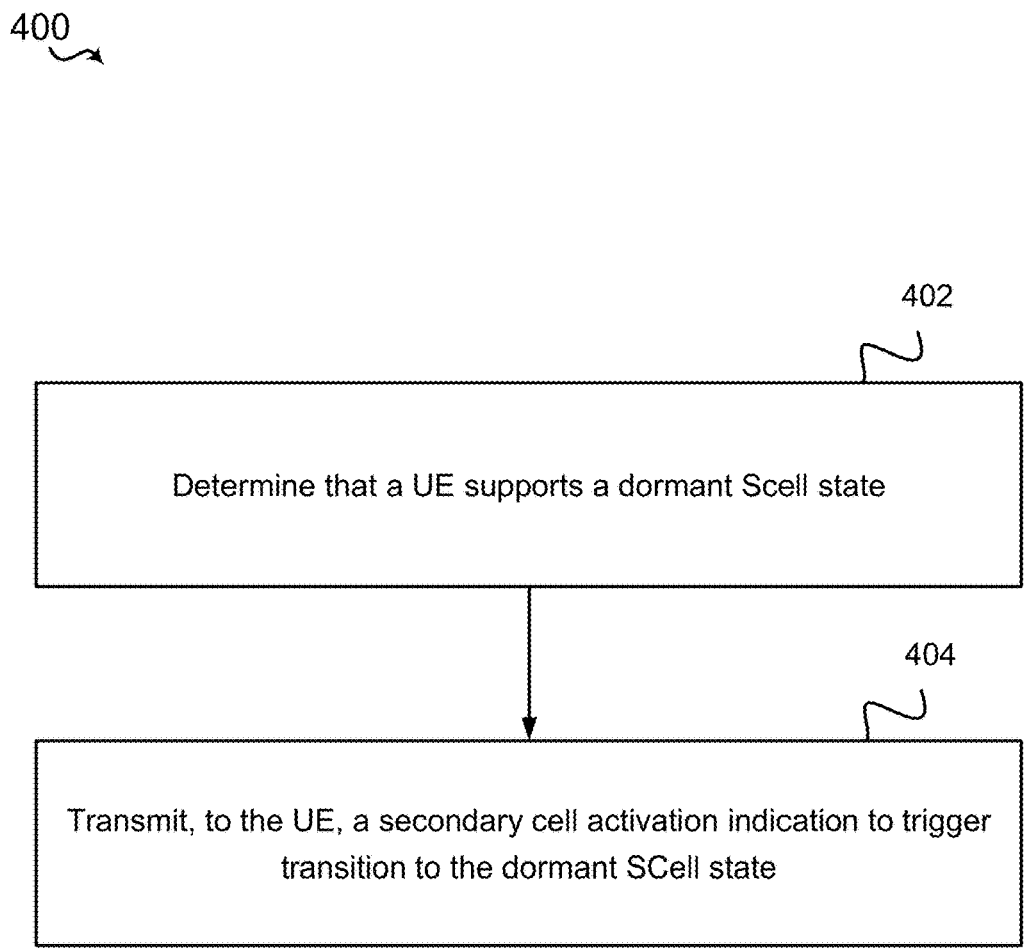
FIG. 4 is a flow diagram of another example of a method of wireless communication at a network entity.

Referring to FIG. 4, for example, a method 400 of wireless communication in operating a network entity such as base station 105 (e.g., eNB) according to one or more of the herein-defined actions.

At block 402, the method 400 may determine that a UE supports a dormant SCell state. For example, as described herein, the modem 160 of the base station 105 may execute cell activation component 170 to determine that a UE 110 supports a dormant SCell state 172.

At block 404, the method 400 may transmit, to the UE, a secondary cell activation indication to trigger transition to the dormant SCell state. For example, as described herein, the modem 160 of the base station 105 may execute cell activation component 170 to transmit, to the UE 110, a secondary cell activation indication 176 to trigger transition to the dormant SCell state 172.

In some aspects, transmitting, to the UE 110, the secondary cell activation indication may include transmitting the secondary cell activation indication 176 as a MAC control element 178.

In some aspects, although not shown, the method 400 may receive, from the UE 110, at least one of CSI, SRS information based on received CSI configuration, CSI+SRS, NZP CSI-RS/IMR configuration, or SRS Configuration information associated with at least one secondary cell.

In some aspects, although not shown, the method 400 may transmit, on a PDCCH, DCI to trigger a transition from the secondary cell activated state (corresponding to the dormant SCell state 172) to a distinct secondary cell activated state, the distinct secondary cell activated state including PDCCH monitoring.

In some aspects, although not shown, the method 400 may receive, from the UE 110, at least one of a radio resource measurement (RRM) or CSI report during the dormant SCell state. For example, in the dormant SCell state 172, the base station 105 (e.g., eNB) may receive RRM and/or CQI reports. Further, in some aspects, although not shown, the method 400 may further activate one or more SCells based on at least one of the RRM or CSI report. For instance, in the dormant SCell 172 state, the base station 105 (e.g., eNB) may use RRM and/or CQI reports received from UE 110 to determine which SCells to activate.

In some aspects, although not shown, the method 400 may schedule one or more UEs including the UE 110 following transmission of the secondary cell activation indication 176. For example, in dormant SCell state 172, the base station 105 (e.g., eNB) may use RRM and/or CQI reports received from the UE 110 to schedule one or more UEs quickly after state transition to the dormant SCell state 172 to maximize scheduling efficiency.

In some aspects, transmitting the secondary cell activation indication 176 may include transmitting the secondary cell activation indication 176 to trigger transition to the dormant SCell state 176 independent of another SCell state based on the at least one of the RRM or CSI report. For example, the base station 105 may use RRM and/or CQI reports received from the UE 110 to determine which base station controls each SCell state transition independently.

In some aspects, although not shown, the method 400 may schedule data transmission associated with an SCell based on the at least one of the RRM or CSI report. For instance, in the dormant SCell state 172, the base station 105 may use RRM and/or CQI reports received from UE 110 to determine scheduling of data bursts using SCells thereby minimizing UE power consumption.

In some aspects, although not shown, the method 400 may determine that a timer corresponding to a period of time during which the network communicates with the UE 110 in an active state has expired, and enter the dormant SCell state 172 based on determining that the timer has expired. Further, in some aspects, transmitting the secondary cell activation indication 176 may include transmitting based on determining that the timer has expired.

For instance, the network via the base station 105 may configure one or more timers for state transitions. Specifically, the network may configure at least two timers. These timers may be used as an alternate mechanism of the MAC-CE based state transitions. In one example, when a first timer corresponding to a period of time in an active state expires, without any communication of the MAC-CE element 178 from the base station 105, both the UE 110 and the base station 105 may transition SCell into the dormant SCell state 172. In another example, when a second timer corresponding to a period of time in the dormant SCell state 172 expires, SCell may transition to a low power deactivate state. The same timers may be maintained at both the UE 110 and the base station 105 such that the start triggers may be the same at both the UE 110 and the base station 105.

Further, when a timer expires, one or both of the UE 110 and the base station 105 may perform state transitions. Both the UE 110 and the base station 105 may remain in sync for some or all state transitions. In some aspects, the timers may be configured during SCell configuration and the values of the timers may be determined so as to optimize UE power consumption (e.g., to avoid the UE 110 remaining in high power state for a long period of time). Further, in some aspects, the network may maintain separate timers for transition from an active state to the dormant SCell state 172 and dormant SCell state 172 to idle state. Additionally, when the network sends the MAC-CE 178 to transition the UE SCell to an active state, if timer is configured for the UE 110, both the UE 110 and the network (e.g., base station 105) may begin the timer when the UE 110 enters the active state. Similarly another timer may start at the network when the UE 110 enters the dormant SCell state 172.

Figure 5:
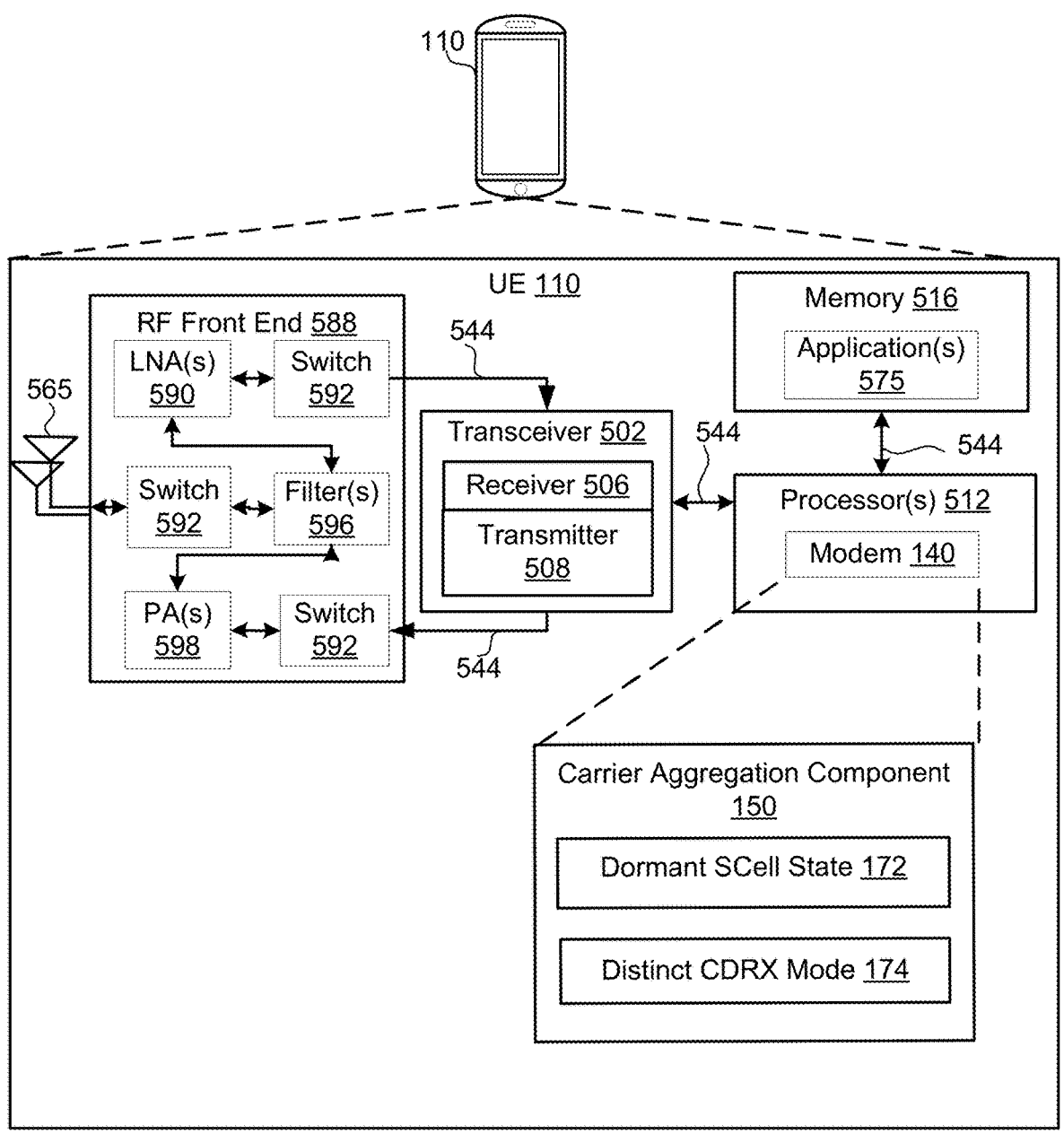
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and carrier aggregation component 150 as described herein. Further, the one or more processors 512, modem 140, memory 516, transceiver 502, radio frequency (RF) front end 588 and one or more antennas 565, may be configured to support voice and/or data calls (simultaneously or non-simultaneously) in one or more radio access technologies. In some aspects, the modem 514 may be the same as or similar to the modem 140.

In an aspect, the one or more processors 512 can include a modem 140 that uses one or more modem processors. The various functions related to resource identification component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with resource identification component 150 may be performed by transceiver 502.

Also, memory 516 may be configured to store data used herein and/or local versions of applications 575 or resource identification component 150 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining resource identification component 150 and/or one or more of its subcomponents, and/or data associated therewith, when UE 110 is operating at least one processor 512 to execute resource identification component 150 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a RF receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may include, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 105 or wireless transmissions transmitted by UE 110. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and a corresponding specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 125 or one or more cells associated with one or more base stations 125. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
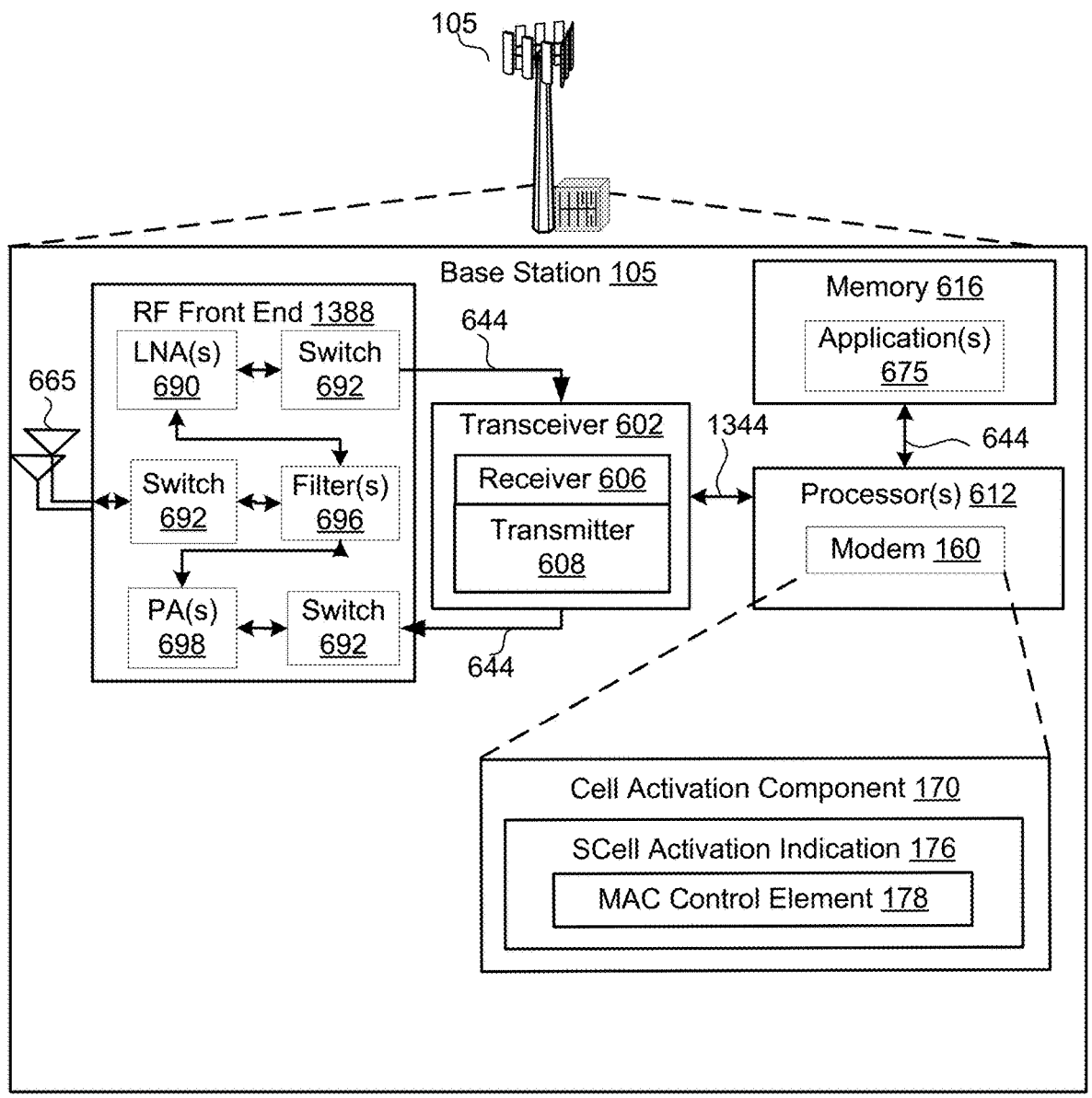
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and cell activation component 170 to enable one or more of the functions described herein.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a user equipment (UE), comprising:
   determining that a secondary cell (SCell) activation condition has been satisfied;
   transitioning to a SCell activated state based on determining that the SCell activation condition has been satisfied, the SCell activated state corresponding to a dormant SCell state; and
   operating at least in the dormant SCell state, including reporting a sounding reference signal (SRS) while in the dormant SCell state characterized by a longer periodicity and non-multi-port SRS transmission.

2. The method of claim 1, wherein operating at least in the dormant SCell state includes at least one of:
reporting at least one of channel state information (CSI), the SRS based on received CSI configuration, CSI+SRS, Non-Zero Power (NZP) CSI reference signal (RS) Interference Measurement Report (IMR) configuration, or SRS Configuration information associated with at least one SCell; or
forgoing physical downlink control channel (PDCCH) monitoring of the at least one SCell.

3. The method of claim 2, wherein each of the at least one of the CSI, SRS based on received CSI configuration, CSI+SRS, NZP CSI-RS/IMR, or SRS configuration information associated with at least one SCell is separately configurable.

4. The method of claim 2, wherein the reporting includes reporting of at least one of the CSI or the SRS in at least one of an activated connected state discontinuous reception cycle (CDRX) or irrespective of a CDRX state.

5. The method of claim 2, wherein the reporting includes reporting the CSI to provide measurement information for the at least one SCell on a primary cell or one or more different SCells.

6. The method of claim 2, wherein forgoing of PDCCH monitoring includes forgoing monitoring of at least one of a short PDCCH (sPDCCH), or an enhanced PDCCH (ePDCCH).

7. The method of claim 1, wherein the reporting includes reporting the SRS using SRS carrier based switching in the dormant SCell state.

8. The method of claim 1, further comprising receiving a discovery reference signal (DRS) periodically based on a DRS configuration during a SCell deactivated state.

9. The method of claim 8, wherein the reporting includes reporting the CSI in the dormant SCell state based on the DRS configuration.

10. The method of claim 1, wherein determining that the SCell activation condition has been satisfied includes receiving, from a network entity, a SCell activation indication as a media access control (MAC) control element (CE).

11. The method of claim 10, wherein the MAC CE includes a reserve bit in at least one octet set to a value greater than zero to trigger a transition to the dormant SCell state.

12. The method of claim 10, wherein the MAC CE corresponds to a distinct logical channel identifier (LCID) having an index value of at least one of '01011-11000', '10111', '10110', or an unused LCID.

13. The method of claim 10, wherein the MAC CE corresponds to a zero-length MAC CE command identified by a distinct LCD having an index value of at least one of '01011-1001' or '10110' or an unused LCD.

14. The method of claim 1, further comprising determining that a SCell deactivation condition has been satisfied based on at least one of:
detecting an expiration of a media access control (MAC) SCell deactivation timer,
receiving a MAC control element indicating a SCell deactivation, or detecting handover to another cell associated with at least one SCell.

15. The method of claim 1, further comprising:
receiving, on a physical downlink control channel (PDCCH) at a primary cell or a SCell, downlink control information (DCI) to trigger a transition from the SCell activated state to a distinct SCell activated state, the distinct SCell activated state including PDCCH monitoring; and
transitioning from the SCell activated state to the distinct SCell activated state in response to receiving the DCI on the PDCCH.

16. The method of claim 15, wherein the DCI includes a transmit time interval (TTI) of at least one of one millisecond or a length corresponding to a short TTI.

17. The method of claim 15, wherein the DCI includes a mapping of at least one SCell activation bit to one of an individual SCell identifier or a group SCell identifier.

18. The method of claim 1, further comprising:
determining that a SCell state transition condition has been satisfied; and
transitioning to the SCell activated state from a distinct secondary cell activated state based on determining that the SCell state transition condition has been satisfied.

19. The method of claim 18, wherein determining that the SCell state transition condition has been satisfied includes at least one of:
receiving, on a PDCCH at a primary cell or a SCell, downlink control information (DCI) to trigger a transition to the SCell activated state from a distinct SCell activated state, the distinct SCell activated state including PDCCH monitoring, or
detecting an expiration of a reduced power inactivity timer associated with at least one SCell.

20. The method of claim 19, wherein the reduced power inactivity timer is a function of a connected mode discontinuous reception (CDRX) inactivity timer, or a timer independent of the CDRX inactivity timer.

21. The method of claim 1, further comprising transitioning from the SCell activated state to an SCell deactivated state based at least on one of:
receiving a SCell deactivation indication corresponding to a MAC control element, or
detecting an expiration of a MAC SCell deactivation timer associated with at least one secondary cell.

22. The method of claim 1, further comprising:
receiving a radio resource control (RRC) reconfiguration message to trigger a release of at least one secondary cell from the SCell activated state; and
releasing the at least one SCell and maintaining an RRC connected state with a primary cell.

23. The method of claim 1, wherein transitioning to the SCell activated state includes transitioning from a SCell deactivated state to the SCell activated state based on determining that the SCell activation condition has been satisfied.

24. The method of claim 1, wherein determining that the SCell activation condition has been satisfied includes receiving a radio resource control (RRC) information element following configuration of the least one SCell during RRC connection reconfiguration.

25. A user equipment, comprising:
a memory; and
a processor in communication with the memory, wherein the processor is configured to:
determine that a secondary cell (SCell) activation condition has been satisfied;
transition to a SCell activated state based on determining that the SCell activation condition has been satisfied, the SCell activated state corresponding to a dormant SCell state; and
operate at least in the dormant SCell state, including being configured to report a sounding reference signal (SRS) while in the dormant SCell state characterized by a longer periodicity and non-multi-port SRS transmission.

26. A non-transitory computer-readable medium storing computer executable code for communication, comprising code for:

determining that a secondary cell (SCell) activation condition has been satisfied;

transitioning to a SCell activated state based on determining that the SCell activation condition has been satisfied, the SCell activated state corresponding to a dormant SCell state; and operating at least in the dormant SCell state, including reporting a sounding reference signal (SRS) while in the dormant SCell state characterized by a longer periodicity and non-multi-port SRS transmission.

27. An apparatus for wireless communications, comprising:

means for determining that a secondary cell (Scell) activation condition has been satisfied;

means for transitioning to a SCell activated state based on determining that the SCell activation condition has been satisfied, the SCell activated state corresponding to a dormant SCell state; and means for operating at least in the dormant SCell state, including reporting a sounding reference signal (SRS) while in the dormant SCell state characterized by a longer periodicity and non-multi-port SRS transmission.

\* \* \* \* \*